US011240108B1

(12) United States Patent
    Davies

(10) Patent No.: US 11,240,108 B1
(45) Date of Patent: Feb. 1, 2022

(54) END-TO-END CONFIGURATION ASSISTANCE FOR CLOUD SERVICES

(71) Applicant: Microsoft Technology Licensing, LLC, Redmond, WA (US)

(72) Inventor: Joseph Glenn Davies, Leavenworth, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/147,789

(22) Filed: Jan. 13, 2021

(51) Int. Cl.
    *H04L 12/24* (2006.01)
    *H04L 29/08* (2006.01)
    *G06F 3/0484* (2013.01)

(52) U.S. Cl.
    CPC ........ H04L 41/0883 (2013.01); G06F 3/0484 (2013.01); H04L 41/0806 (2013.01); H04L 41/22 (2013.01); H04L 67/10 (2013.01)

(58) Field of Classification Search
    CPC ... H04L 41/0803–0836; H04L 41/0876–0893; H04L 41/16; H04L 41/22; H04L 41/5041–5054; G06F 3/048–04897
    See application file for complete search history.

(56) References Cited

U.S. PATENT DOCUMENTS

| | | | |
|---|---|---|---|
| 8,621,051 B2 | 12/2013 | Agarwala | |
| 10,498,665 B1* | 12/2019 | Meek | H04L 47/70 |
| 10,735,275 B2* | 8/2020 | Dravid | H04L 41/0896 |
| 2007/0168349 A1* | 7/2007 | Sanghvi | G06F 3/0484 |
| 2014/0129965 A1* | 5/2014 | Sorin | G06F 9/453 |
| | | | 715/762 |
| 2014/0279201 A1* | 9/2014 | Iyoob | G06F 9/5077 |
| | | | 705/26.7 |

(Continued)

OTHER PUBLICATIONS

"AWS Config", Retrieved from: https://web.archive.org/web/20201119055930/https:/aws.amazon.com/config/, Retrieved Date: Nov. 19, 2020, 7 pages.

(Continued)

*Primary Examiner* — Brendan Y Higa
(74) *Attorney, Agent, or Firm* — NovoTechIP International PLLC

(57) ABSTRACT

A data processing system for end-to-end configuration assistance for cloud services implements receiving a request from a client device for a solution assistant configured to provide step-by-step guidance for configuring a plurality of cloud services to interoperate to produce a specified result; causing to be presented a solution assistant user interface; providing the step-by-step guidance comprising a plurality of steps by: launching a configuration interface of a respective cloud service of the plurality of cloud services associated with a respective step of the plurality of steps; presenting step-by-step configuration information providing guidance for configuring the respective cloud service; and receiving a confirmation indication from the client device that the respective cloud service has been configured according to the step-by-step configuration information; generating a summary report that includes a summary of the cloud services configured using the solution assistant; and causing to be presented the confirmation summary report.

20 Claims, 12 Drawing Sheets

(56) References Cited

U.S. PATENT DOCUMENTS

| | | | |
|---|---|---|---|
| 2015/0113145 A1* | 4/2015 | Walls | H04L 67/10 |
| | | | 709/226 |
| 2016/0359690 A1* | 12/2016 | Gravenites | G06F 16/986 |
| 2016/0366233 A1* | 12/2016 | Le | H04L 41/0866 |
| 2020/0358672 A1* | 11/2020 | Lange | H04L 67/1002 |

OTHER PUBLICATIONS

"Configuring BMC Multi-Cloud Service Management", Retrieved from: https://docs.bmc.com/docs/multicloud1805/configuring-bmc-multi-cloud-service-management-809537981.html, Sep. 14, 2018, 4 Pages.

"Get to Know Service Setup and the Service Setup Assistant", Retrieved from: https://web.archive.org/web/20200924005129/https:/help.salesforce.com/articleView?id=console_lex_service_setup.htm &type=5, Retrieved Date: Nov. 21, 2020, 4 Pages.

"Guided Self Services", Retrieved from: https://web.archive.org/web/20200804224814/https:/support.sap.com/en/offerings-programs/enterprise-support/enterprise-support-academy/guided-self-services.html, Aug. 4, 2020, 6 Pages.

"Oracle B2C Service", https://docs.oracle.com/en/cloud/saas/b2c-service/20c/facca/using-configuration-assistant.pdf, Retrieved Date: Nov. 21, 2020, 58 Pages.

"Perform configuration assessment on cloud services", Retrieved from: https://www.alibabacloud.com/help/doc-detail/142974.htm, Sep. 30, 2020, 3 Pages.

"Using Service Cloud Configuration Assistant", Retrieved from: https://docs.oracle.com/en/cloud/saas/service/18a/facca/oracle-service-cloud-configuration-assistant.html#oracle-service-cloud-configuration-assistant, Retrieved Date: Nov. 21, 2020, 3 Pages.

* cited by examiner

SharePoint Admin Center

Active sites

| Site Name | URL | Storage Used (GB) | Primary Admin |
|---|---|---|---|
| Contoso | ../sites/Contoso | 0.00 | ContosoAdmin |
| Contoso Web | ../sites/ContosoWeb | 0.14 | MOD Admin |
| Contoso Web2 | ../sites/ContosoWeb2 | 0.34 | MOD Admin |
| Public Relations | ../sites/Public... | | |
| Engineering | ../sites/Engine... | | |

New Team with Security Isolation

The Solution Assistant will next walk you through applying the Sensitivity Label in SharePoint.

In this step, Solution assistant will show you how to configure:

(1) Select the underlying SharePoint site
(2) Apply the sensitivity label to the team from the properties of the underlying SharePoint site

[Previous] [Next]
[Configuration Check]

[Close]

END-TO-END CONFIGURATION ASSISTANCE FOR CLOUD SERVICES

BACKGROUND

Cloud services provide on-demand availability of applications and services to users via the Internet. Cloud services may provide standalone solutions for various needs of the user. These services may also be integrated and combined in specific ways to solve larger business and information technology (IT) problems. However, combining these applications or services to achieve a specific result may present unique configuration problems. Each application or service may need to be configured in a specific way to ensure that the applications or services interoperate in a desired manner to achieve the specific result. Each application or service may need to be configured separately using an administrative interface associated with that application or service. The procedures for configuring each application or service may be explained in documentation associated with each respective application or service, but the process for configuring each of these applications or services to work together to achieve a specific result is typically not covered in a comprehensive manner in the documentation of each of the applications or services. Even if they are, errors in configuration across applications or services can lead to frustration, the need for troubleshooting, and decreased customer satisfaction. Hence, there is a need for improved systems and methods that provide a technical solution for providing assistance for end-to-end configuration for cloud services.

SUMMARY

An example data processing system according to the disclosure may include a processor and a computer-readable medium storing executable instructions. The instructions when executed cause the processor to perform operations including receiving a request from a client device for a solution assistant, wherein the solution assistant is configured to provide step-by-step guidance for configuring a plurality of cloud services to interoperate to produce a specified result; causing to be presented, on a display of the client device, a solution assistant user interface; providing, via the solution assistant user interface, the step-by-step guidance comprising a plurality of steps by: launching a configuration interface of a respective cloud service of the plurality of cloud services associated with a respective step of the plurality of steps; presenting step-by-step configuration information providing guidance for configuring the respective cloud service via the configuration interface; and receiving a confirmation indication from the client device that the respective cloud service has been configured according to the step-by-step configuration information; generating a summary report that includes a summary of the cloud services configured using the solution assistant; and causing to be presented, on the display of the client device, the confirmation summary report.

An example method implemented in a data processing system for end-to-end configuration assistance for cloud services includes receiving a request from a client device for a solution assistant, wherein the solution assistant is configured to provide step-by-step guidance for configuring a plurality of cloud services to interoperate to produce a specified result; causing to be presented, on a display of the client device, a solution assistant user interface; providing, via the solution assistant user interface, the step-by-step guidance comprising a plurality of steps by: launching a configuration interface of a respective cloud service of the plurality of cloud services associated with a respective step of the plurality of steps; presenting step-by-step configuration information providing guidance for configuring the respective cloud service via the configuration interface; and receiving a confirmation indication from the client device that the respective cloud service has been configured according to the step-by-step configuration information; generating a summary report that includes a summary of the cloud services configured using the solution assistant; and causing to be presented, on the display of the client device, the confirmation summary report.

An example computer-readable storage medium on which are stored instructions. The instructions when executed cause a processor of a programmable device to perform functions of obtaining and receiving a request from a client device for a solution assistant, wherein the solution assistant is configured to provide step-by-step guidance for configuring a plurality of cloud services to interoperate to produce a specified result; causing to be presented, on a display of the client device, a solution assistant user interface; providing, via the solution assistant user interface, the step-by-step guidance comprising a plurality of steps by: launching a configuration interface of a respective cloud service of the plurality of cloud services associated with a respective step of the plurality of steps; presenting step-by-step configuration information providing guidance for configuring the respective cloud service via the configuration interface; and receiving a confirmation indication from the client device that the respective cloud service has been configured according to the step-by-step configuration information; generating a summary report that includes a summary of the cloud services configured using the solution assistant; and causing to be presented, on the display of the client device, the confirmation summary report.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A, 3B, 3C, 3D, 3E, 3F, and 3G are examples of an admin center service user interface and examples of a solution assistant user interface.

DETAILED DESCRIPTION

Figure 1:
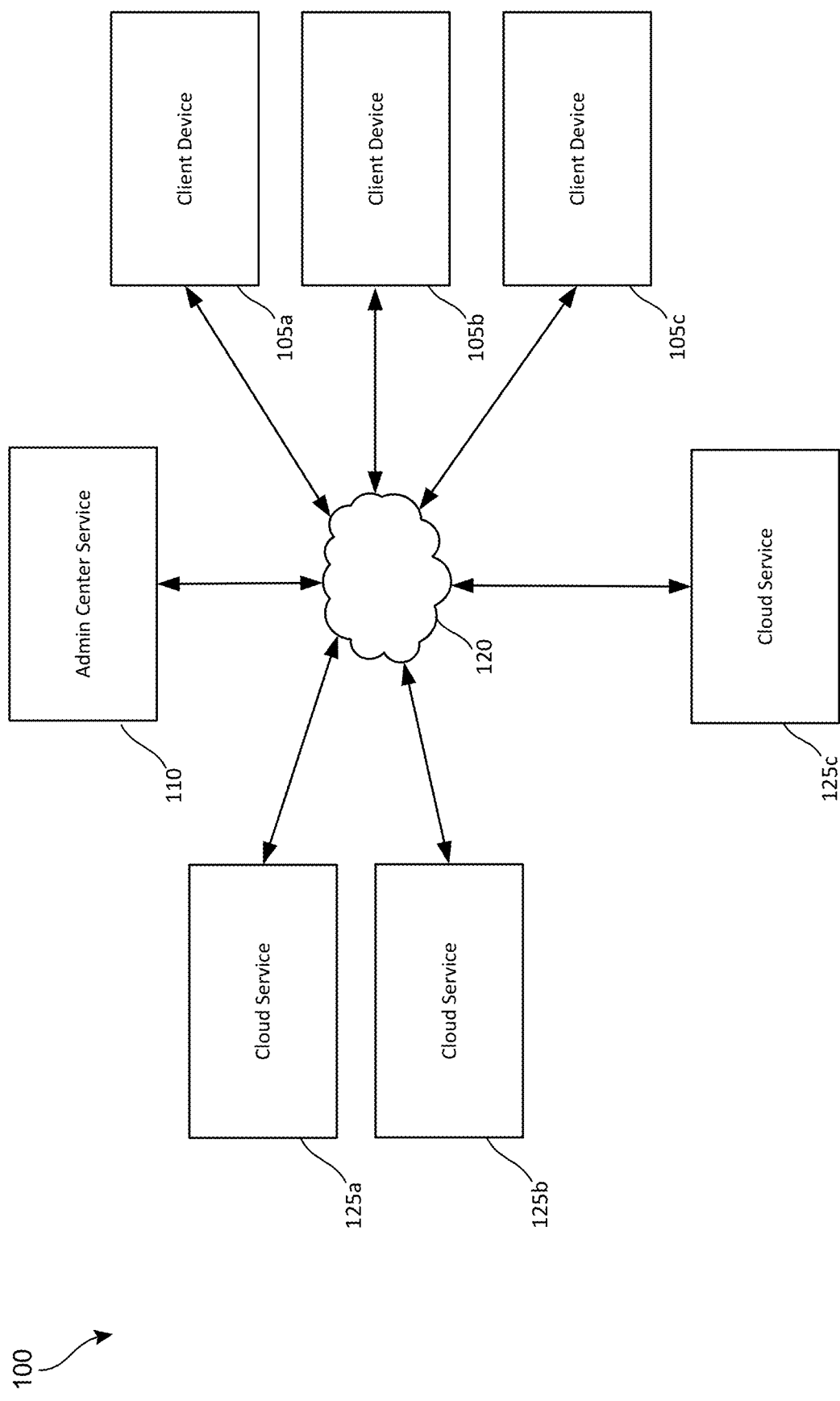
FIG. 1 is a diagram showing an example computing environment 100 in which the techniques provided herein for end-to-end configuration assistance for cloud services may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for end-to-end configuration assistance for cloud services presented herein provide a technical solution for assisting users in end-to-end configuration across multiple cloud services to implement a solution to a business or IT problem faced by a user. The types of solutions provided may depend on the types of cloud services available and the interoperability of the cloud services. The techniques disclosed herein provide solution assistants configured to guide the user through the configuration process across multiple cloud services to achieve a desired solution. Multiple solution assistants may be created to address various problems that may be faced by users. The solution assistants may be presented to the user in an administration interface that allows the user to select from the available solution assistants. The solution assistants may be configured to use different subsets of the available cloud services depending upon the problem to be solved the respective solution provided by the solution assistant.

The user may select one of the available solution assistants presented in the solution assistant user interface. The solution assistants can be created and published to the solution assistant user interface by the cloud service provider or, alternately, created by a user with administrator privileges. The selected assistant may present content that guides the user step-by-step through the configuration process across multiple cloud services. The solution assistant may automatically launch a configuration interface of the cloud service to be configured at each step. Thus, the user, who may not be familiar with the cloud service being configured, does not need to determine how to navigate to the configuration interface of the cloud service to be configured. Furthermore, the solution assistant may be configured to present the user with a video that describes in detail which actions need to be performed at that step. The video may describe which parameters need to be configured at this step and where they may be located on the configuration interface of the cloud service being configured. Once a step has been completed, the solution assistant may guide the user through each subsequent step associated with the solution to configure the other cloud services associated with that solution.

A technical benefit of this approach is that the user is guided through the configuration process across cloud services so that the user does not need to understand how the services interact in advance nor does the user need to review the extensive documentation associated with each service to determine which parameters need to be configured in each service to achieve the desired solution. Another technical benefit is that the solution assistant provides a reentrant capability that stores the configuration information entered by the user so that the user may make changes to an existing configuration without having to launch the solution assistant and start over from the beginning of the process or navigate their way through the configuration of the previously configured solution. Yet another technical benefit of the solution assistant is that the solution assistant may be configured to perform a configuration check at each step to determine whether the user has configured each of the options that are meant to be configured at that step. This approach allows the user to quickly address any misconfigured or missing information. These and other technical benefits of the techniques disclosed herein will be evident from the discussion of the example implementations that follow.

FIG. 1 is a diagram showing an example computing environment 100 in which the techniques provided herein for end-to-end configuration assistance for cloud services may be implemented. The computing environment 100 may include cloud services 125a, 125b, and 125c. The example computing environment 100 may also include client devices 105a, 105b, and 105c and an admin center service 110. The client devices 105a, 105b, and 105c may communicate with the admin center service 110 and/or the cloud services 125a, 125b, and/or 125c via the network 120.

The cloud services 125a, 125b, and 125c may provide one or more applications or services that are accessible to the client devices 105a, 105b, and 105c. The cloud services 125a, 125b, and 125c may implement a word processing application, a file collaboration platform, a communications platform, a presentation design application, an email application or email service, a note-taking application, and/or other cloud-based applications or services that allow the user to consume, create, share, collaborate on, and/or modify content. The cloud services 125a, 125b, and 125c may be implemented by the same provider or may be implemented by two or more different providers. The cloud services 125a, 125b, and 125c may be implemented on separate cloud-based server system as shown in FIG. 1 or two or more of the cloud services 125a, 125b, and 125c may be implemented on the same set of servers. Furthermore, other implementations may include a different number of cloud services.

The admin center service 110 may be implemented as a cloud-based service or set of services that may provide a user interface for administering various operating parameters of the cloud services 125a, 125b, and 125c. The admin center service 110 may provide a service admin user interface which may present a list of solution assistants that may be selected to guide a user through the configuration of a set of cloud services of the cloud services 125a, 125b, and 125c. The admin center service 110 may also provide a user interface for accessing saved configurations which allows a user to access saved configuration information associated with a solution assistant. The saved configuration information allows the user to modify the configuration provided by the solution assistant without having to restart the setup process from the beginning. The admin center service 110 may also provide a solution assistant administration user interface that enables an administrator to create new solution assistants, modify existing solution assistants, or remove existing solution assistants.

The example shown in FIG. 1 is implemented as a standalone service. In other implementations, the functionality of the admin center service 110 may be implemented by one of the cloud services 125a, 125b, and 125c.

The client devices 105*a*, 105*b*, and 105*c* each is a computing device that may be implemented as a portable electronic device, such as a mobile phone, a tablet computer, a laptop computer, a portable digital assistant device, a portable game console, and/or other such devices. The client devices 105*a*, 105*b*, and 105*c* may also be implemented in computing devices having other form factors, such as a desktop computer, vehicle onboard computing system, a kiosk, a point-of-sale system, a video game console, and/or other types of computing devices. While the example implementation illustrated in FIG. 1 includes three client devices, other implementations may include a different number of client devices. The client devices 105*a*, 105*b*, and 105*c* may be used to access the applications and/or services provided by the cloud services 125*a*, 125*b*, and 125*c*.

Figure 2:
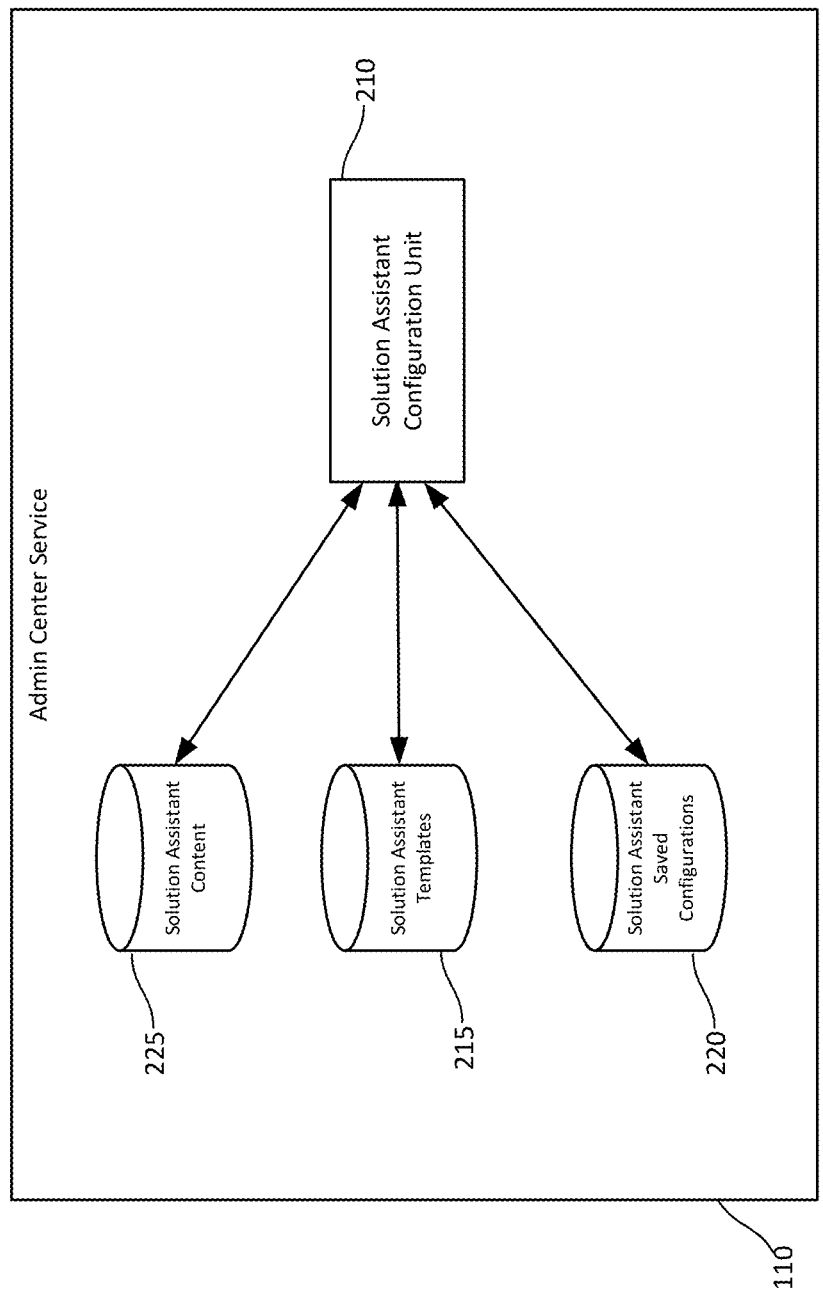
FIG. 2 is an example architecture that may be used, at least in part, to implement the admin center service shown in FIG. 1.

FIG. 2 is an example architecture that may be used, at least in part, to implement the admin center service 110 shown in FIG. 1. The admin center service 110 may include a solution assistant configuration unit 210. The admin center service 110 may also include a templates datastore 215, saved configuration datastore 220, and a solution assistant content datastore 225.

The template datastore 215 may include templates for solution assistants. A template may include information identifying each of the steps associated with a particular solution. The template may include content to be presented to the user for guiding the user through the configuration process. The template may include textual content describing the actions to be taken to configure the cloud service at each step. The template may also identify video content to be presented to the user at each step. The video content may describe the actions that the user will perform to configure the textual content at that step. The textual content and the video content may be stored in the solution assistant content datastore 225. The video content associated with a solution assistant may be implemented as one or more video files, and the template may include a Universal Resource Identifier (URI) other type of link, or filename, or reference to the video content to be presented to the user at each step. The template may include a start point and end point within the video file associated with each step. The template may include a URI or other link to a configuration page associated with the cloud service to be configured in a step. The template may be saved in the template's datastore 215. The template may be published as a solution assistant which is visible to other users of the admin center service 110. The template may include a flag that may be set to publish the template as a solution assistant that may be accessed as other users.

The solution assistant configuration unit 210 may be configured to provide a user interface that presents a list of the published solution assistants that allows the user to select a solution assistant to launch to guide the user through the configuration associated with the selected solution assistant. The solution assistant configuration unit 210 may be configured to access the templates datastore 215 to access the templates that have been published. The solution assistant configuration unit 210 may be configured to access the solution assistant content datastore 225 to access the textual and/or video content associated with each step of the solution provided by the solution assistant. The solution assistant configuration unit 210 may also be configured to store saved configurations in the saved configurations datastore 220. The user may save the state of the solution assistant as a saved configuration in the saved configurations datastore 220. The saved state may be used to restore the state of the solution assistant to allow the user to return to the solution assistant at any time to make modifications to the solution configuration of one or more of the cloud services 125*a*, 125*b*, and 125*c* without having to start the solution configuration process from the beginning. Examples of a user interface that may be provided by the solution assistant configuration unit 210 are shown in FIGS. 3A, 3B, 3C, 3D, 3E, 3F, and 3G.

FIGS. 3A, 3B, 3C, 3D, 3E, 3F, and 3G show an example of a solution assistant guiding a user through the configuration of several cloud services to provide solution to a particular business need or IT need. In this example, a solution assistant guides a user through the setting up and configuring of a team in Microsoft Teams with security isolation. This example demonstrates how a solution assistant may guide a user through the configuration of multiple cloud services to customize the settings each of these services to achieve the solution associated with the solution assistant.

Figure 3A:
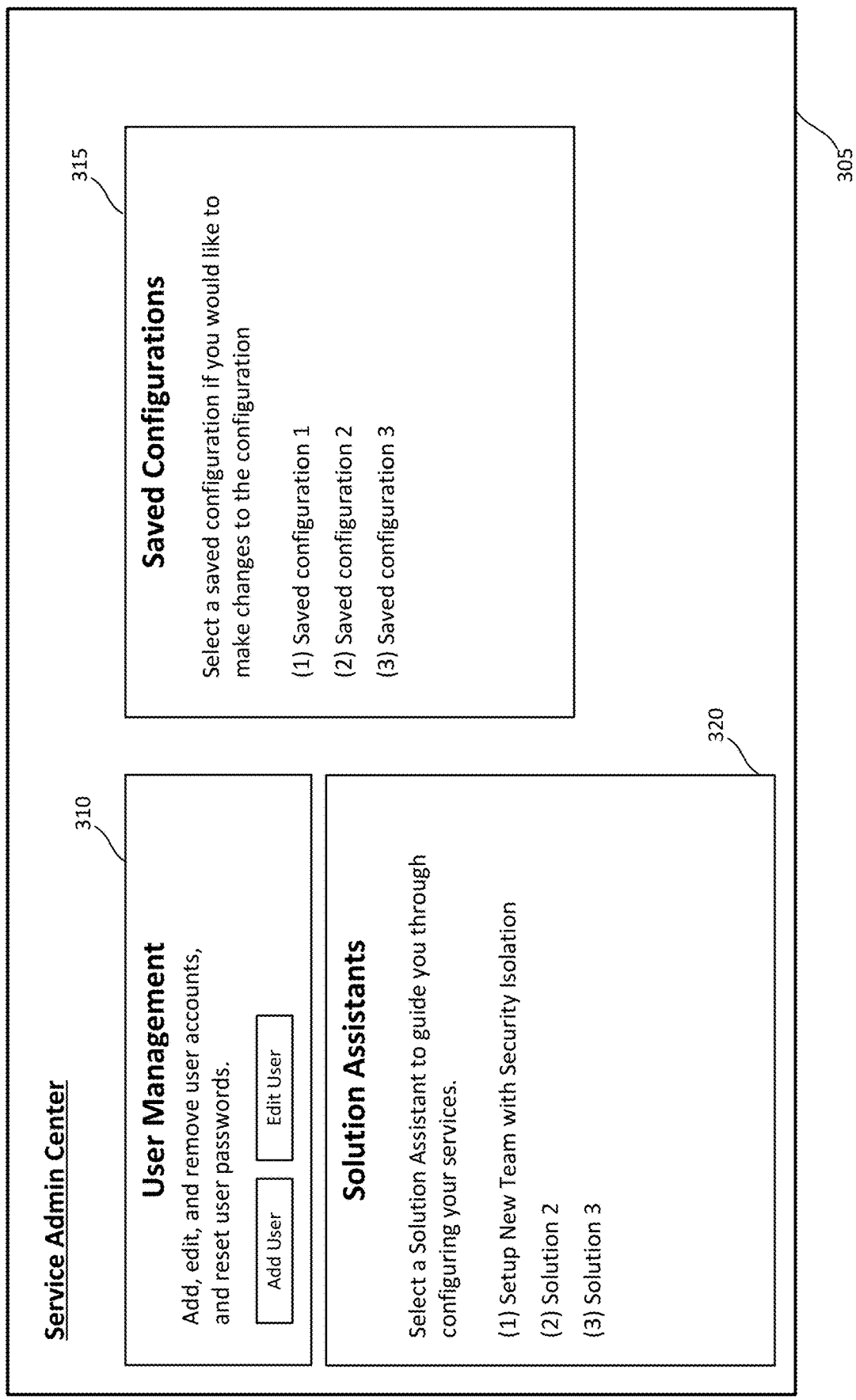

FIG. 3A shows an example user interface 305 for an admin center service that provides an interface for accessing and executing solution assistants. The admin center service may be implemented by the admin center service 110 and provide the user interface 305 for customizing various operating parameters of the cloud services 125*a*, 125*b*, and 125*c*. The admin center service may be used by an administrator that manages the configuration of the applications and/or services provided by the cloud services 125*a*, 125*b*, and 125*c* for a corporation or other entity. The admin center service may be accessed by a user from a client device, such as the client devices 105*a*, 105*b*, and 105*c*, and the user interface 305 may be displayed in a browser or a native application of the client device.

The user interface 305 includes a user management pane 310, a solution assistant pane 320, and a saved configuration pane 315. The user interface 305 may include other user interface elements instead of or in addition to the three panes shown in this example. For example, the user interface 305 may include functionality for adding and/or removing cloud services, and/or other administrative tasks.

The user management pane 310 may include functionality for adding, modifying, and/or deleting user accounts. The user management pane 310 may also enable an administrator to configure authentication parameters for authenticating users associated with a user account. The user management pane 310 may provide additional features for managing user accounts. The user management pane 310 is an example of one of the types of panes that may be included in the user interface 305. However, the user management functionality provided by the user management pane is not required to implement the solution assistant related features of the admin center service.

The solution assistant pane 320 may provide a list of solution assistants that have been published. The published solution assistants may be obtained from the templates datastore 215. Each solution assistant guides the user through the configuration of a set of cloud services, such as the cloud services 125*a*, 125*b*, and 125*c*, to provide a particular solution. As discussed in the preceding examples, the solution assistants may be created and published by a provider of one or more of the cloud services 125*a*, 125*b*, and 125*c* to configure a cross-service solution to a particular business and/or IT problem or a user with administrator privileges. The user may select one of the solution assistants from the list to guide the user through the configuration process as will be discussed further with respect to FIGS. 3B-3G.

The saved configuration pane 315 may provide a list of saved configurations that store the state of a solution assistant was previously used to configure cloud services to implement a particular solution. The saved configurations may be stored in the saved configurations datastore 220. The saved configuration information allows the user to modify the configuration provided by the solution assistant without having to restart the setup process from the beginning.

Figure 3B:
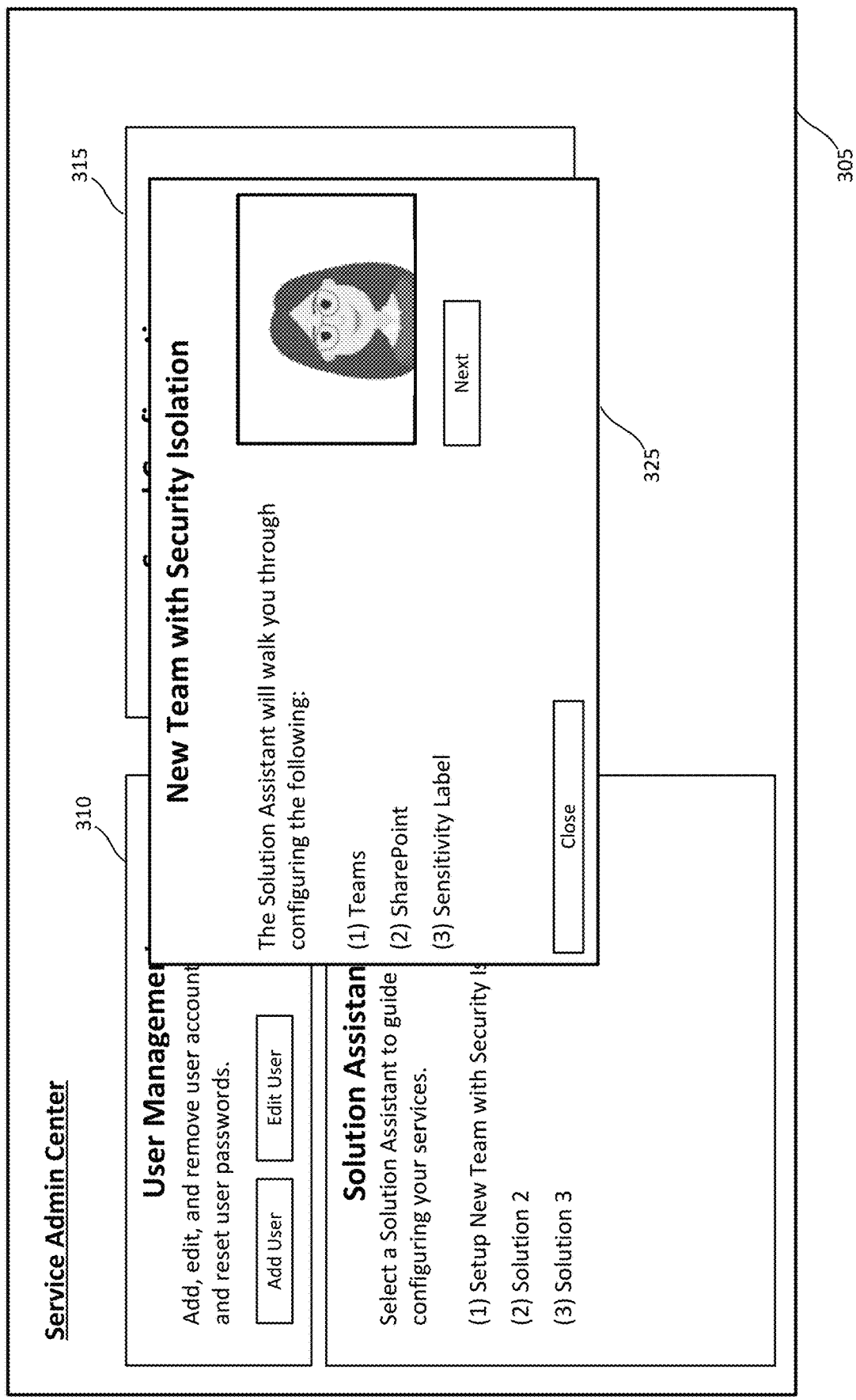

FIG. 3B shows an example of the user interface 305 in which the user has selected a solution assistant from the list of solution assistants from the solution assistant pane 320. The solution assistant user interface 325 is displayed in response to the user selecting the solution assistant. In the example shown in FIG. 3B, the solution assistant guides a user through the setting up and configuring a team in Microsoft Teams with security isolation. The solution assistant user interface 325 provides a textual description of the solution that the selected solution assistant is configured to guide the user through. The textual description also may include a list of the steps that the solution assistant is going to guide the user through, and the cloud services associated with each step. The solution assistant user interface 325 may also present a video clip that discusses the solution for which the solution assistant is configured to guide the user through. As discussed above, the textual and/or video content presented on the solution assistant user interface 325 may be obtained from the solution assistant content datastore 225. The user may click the "next" button to move to the next step of the solution assistant.

Figure 3C:
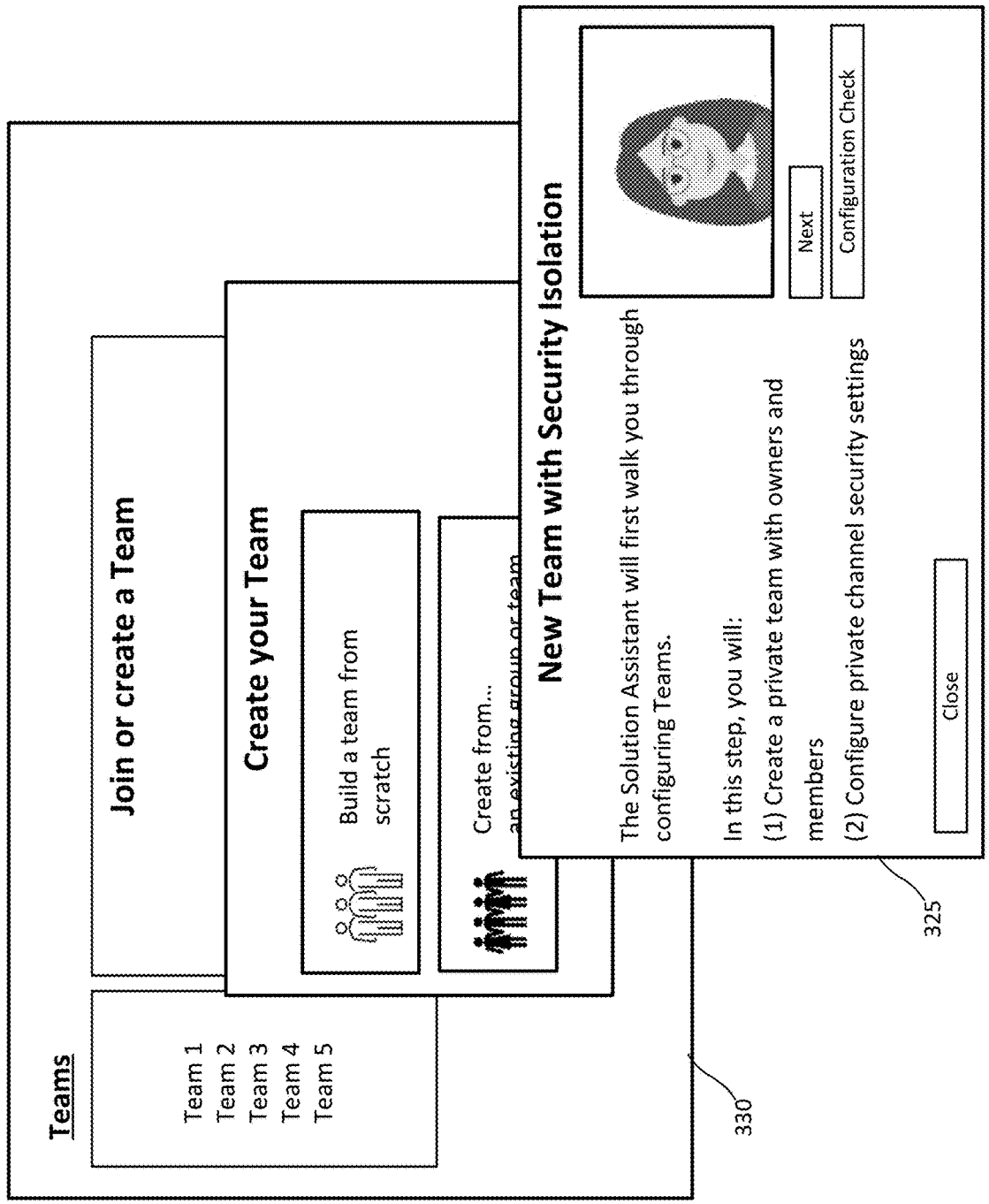

FIG. 3C shows an example of the solution assistant user interface 325 displaying the first step of the solution assistant. In this step, the solution assistant guides the user through a step of setting up a private team in Microsoft Teams with additional settings for security isolation. The admin center service 110 accesses the solution assistant template information associated with the current step to obtain the URI or other link to the configuration page of the cloud service to be configured in this step. In the example shown in FIG. 3C, the admin center service 110 has caused the Microsoft Teams application 330 to launch on the client device of the user, and the solution assistant user interface 325 displays the textual content explaining the actions that the user will be taking in this step and a video clip that walks the user through the completing these actions. The video clip may show the user how to navigate through the application 330 to configure the parameters that need to be configured in this step.

The solution assistant may be configured to capture information that the user inputs into the user interface of the application 330. The solution assistant may capture this information which may be stored in the saved configuration datastore 220. The user may relaunch the solution assistant with the saved configuration to restore the state of the solution assistant. The solution assistant may be configured to obtain the information that the user inputs into the application in various ways. In some implementations, the application 330 may be implemented as a native application on the client device 105, and the application 330 may expose an application programming interface (API) that allows the solution assistant to obtain the configuration information that the user input into the application 330. In other implementations, the application 330 may be a web-based application that may be accessed through a web browser on the client device 105. The solution assistant may be configured to obtain the information input into the application 330 by extracting the information from the Document Object Model (DOM) of the webpage of the application 330. Other implementations may use other means for capturing the information input by the user into the application 330.

The solution assistant user interface 325 may include a "configuration check" button to cause the solution assistant to perform a configuration check to determine whether the user has configured the parameters in the application 330 that were specified in the textual and/or video content presented by the solution assistant user interface 325. The solution assistant may compare the information that has been input by the user into the application 330 with the information specified in the template associated with the solution assistant to determine whether the user has configured each of the parameters of the application 330 that were specified in the template for the solution assistant. For example, in the example shown in FIG. 3C, the solution assistant may check to see whether: (1) a new team has been created, (2) the new team was made private, (3) an owner or owners and members have been assigned to the team, and (4) private channel security settings have been configured. The solution assistant may notify the user that one or more of these elements have not been configured.

Figure 3D:
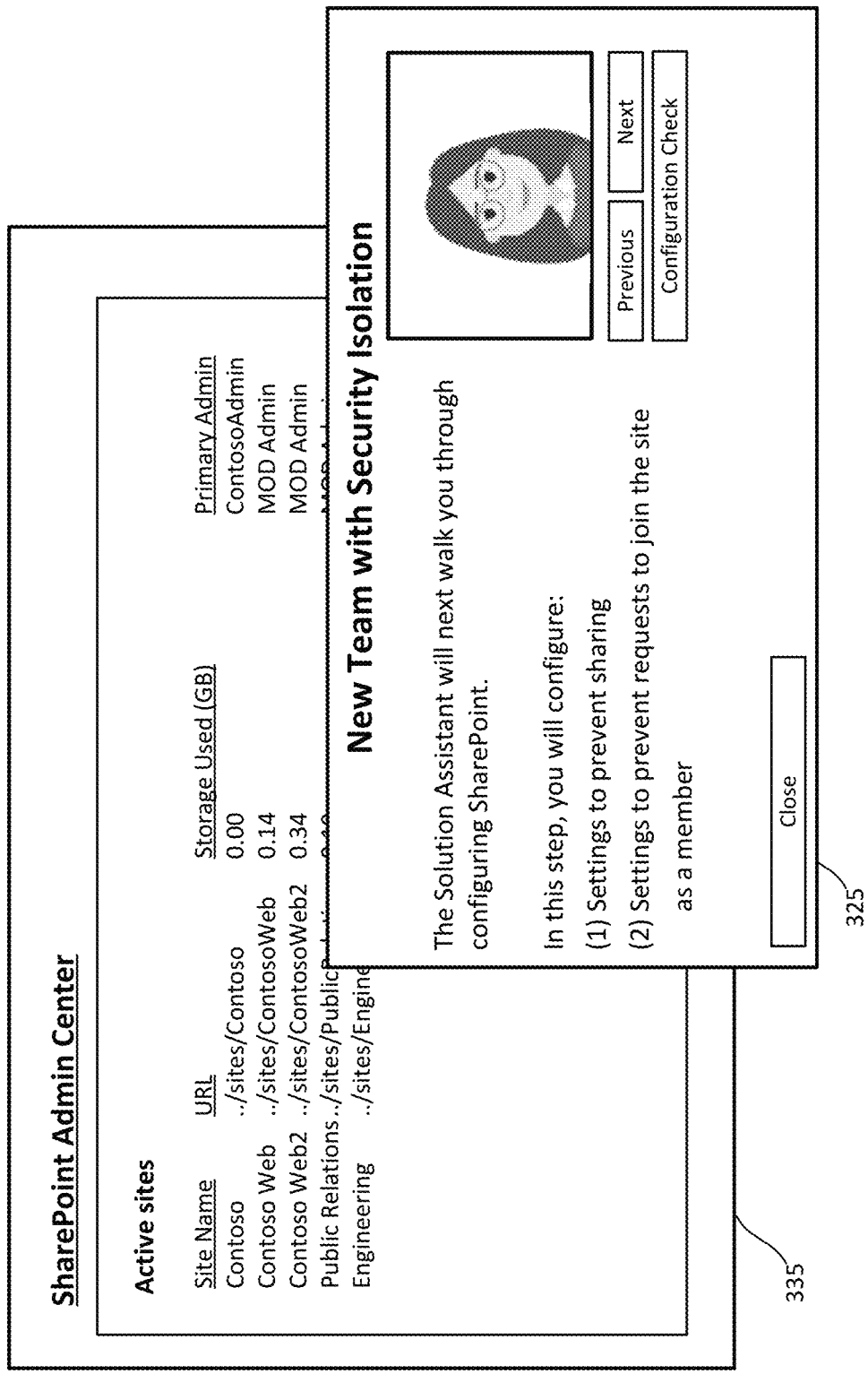

Once the user has performed the actions specified in the textual and/or video content presented by the solution assistant user interface 325, the user may click on the "next" button to move on to the next step in the configuration process, which is shown in FIG. 3D.

FIG. 3D shows an example of the solution assistant user interface 325 displaying the second step of the solution assistant. In this step, the solution assistant guides the user through setting up SharePoint for the team that was created in the preceding step. The solution assistant user interface 325 provides textual and/or video content that guides the user through the configuration process for this step. The admin center service 110 accesses the solution assistant template information associated with current step to obtain the URI or other link to the configuration page of the cloud service to be configured in this step and accesses the configuration page of the cloud service associated with that step. As discussed with respect to FIG. 3C, the URI or other link may be used to launch a native application on the client device 105 or a web-based application in a browser on the client device. The user may click the "check configuration" button to cause the solution assistant to perform a configuration check to determine whether the user has configured the parameters in the application 330 that were specified in the textual and/or video content presented by the solution assistant user interface 325. The user may click on the "next" button to move on to the next step in the configuration process, which is shown in FIG. 3E.

Figure 3E:
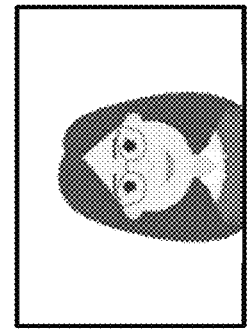

FIG. 3E shows an example of the solution assistant user interface 325 displaying the third step of the solution assistant. In this step, the solution assistant guides the user through setting up a sensitivity label in the security and compliance center service 340 for the team that was created in the preceding steps. The solution assistant user interface 325 once again provides textual and/or video content that guides the user through the configuration process for this step. The security and compliance center service 340 is launched using the URI included in the template for that step of the solution assistant. The user may then configure the parameters associated with this step. The user may then click on the "configuration check" button to perform a configuration check or click the "next" button to move on to the next step in the configuration process, which is shown in FIG. 3F.

FIG. 3F shows an example of the solution assistant user interface 325 displaying the fourth step of the solution assistant. In this step, the solution assistant guides the user through applying the sensitivity label to the team in SharePoint. The solution assistant user interface 325 once again provides textual and/or video content that guides the user through the configuration process for this step. The security and compliance center service 340 is launched using the URI included in the template for that step of the solution assistant. The user may then configure the parameters associated with this step. The user may then click on the "configuration check" button to perform a configuration check or click the "next" button to move on to the next step in the configuration process, which is shown in FIG. 3G.

Figure 3G:
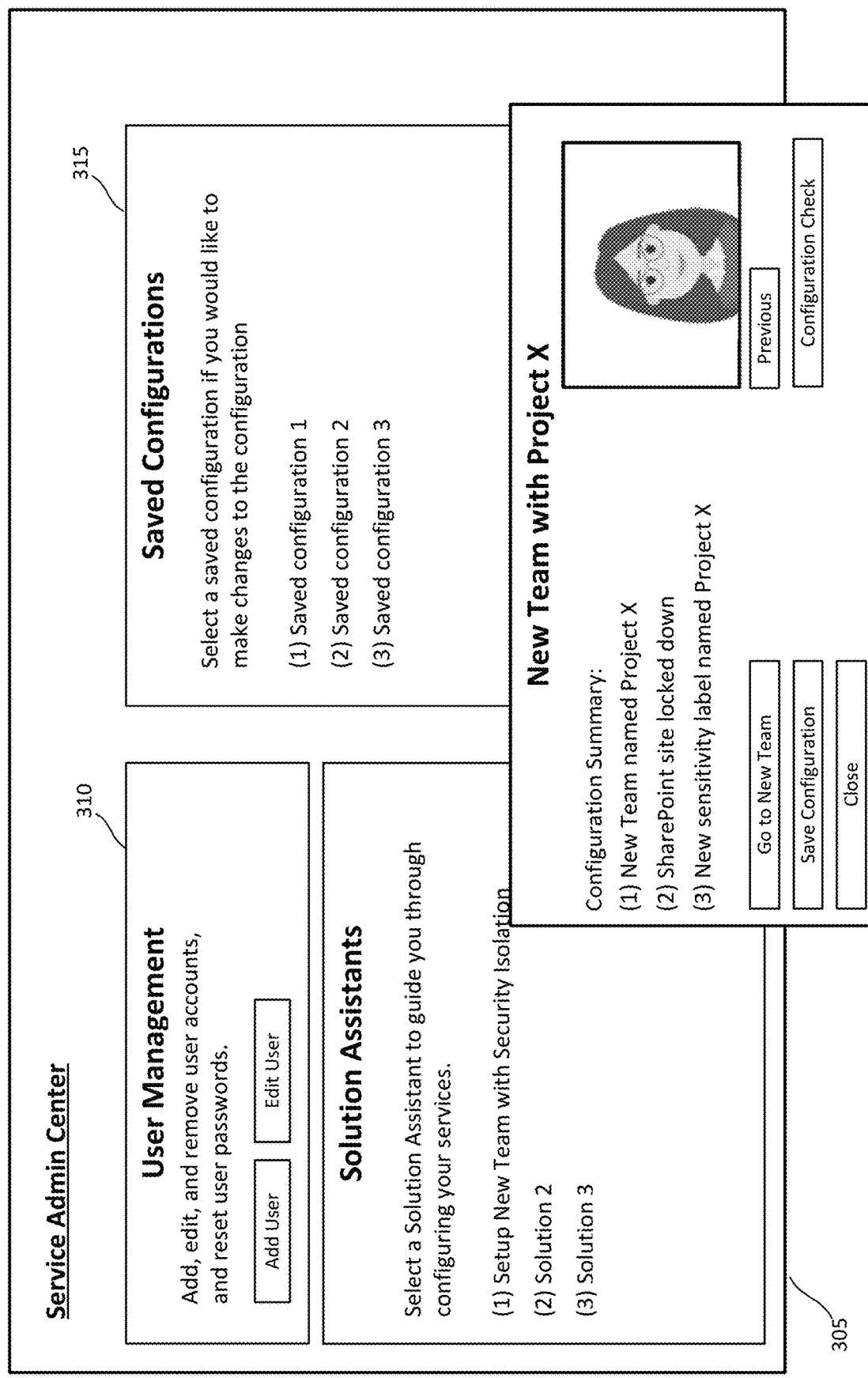

FIG. 3G shows an example of the solution assistant user interface 325 displaying the fifth and final step of the example solution assistant shown in FIGS. 3A-3G. The solution assistant user interface 325 shows a configuration summary that provides a brief description of the steps that were performed to configure the cloud services. The solution assistant user interface may allow the user to go back to the previous screen or perform a configuration check of the information that was input by the user in the preceding steps. The user may also click on the "save configuration" button to save the configuration information collected by the solution assistant in the saved configurations datastore 220. The user may also click on the "Go to New Team" button to launch the Microsoft Teams interface 330 and display the team created in the preceding steps. The "Go to New Team" button is specific to this particular example solution assistant, and other types of solution assistants may present other options to the users with the configuration summary that are associated with the solutions provided by those solution assistants. The solution assistant user interface 325 may also include a "close" button that closes the solution assistant user interface 325 and returns the user to the user interface 305 of the admin center service.

Figure 4:
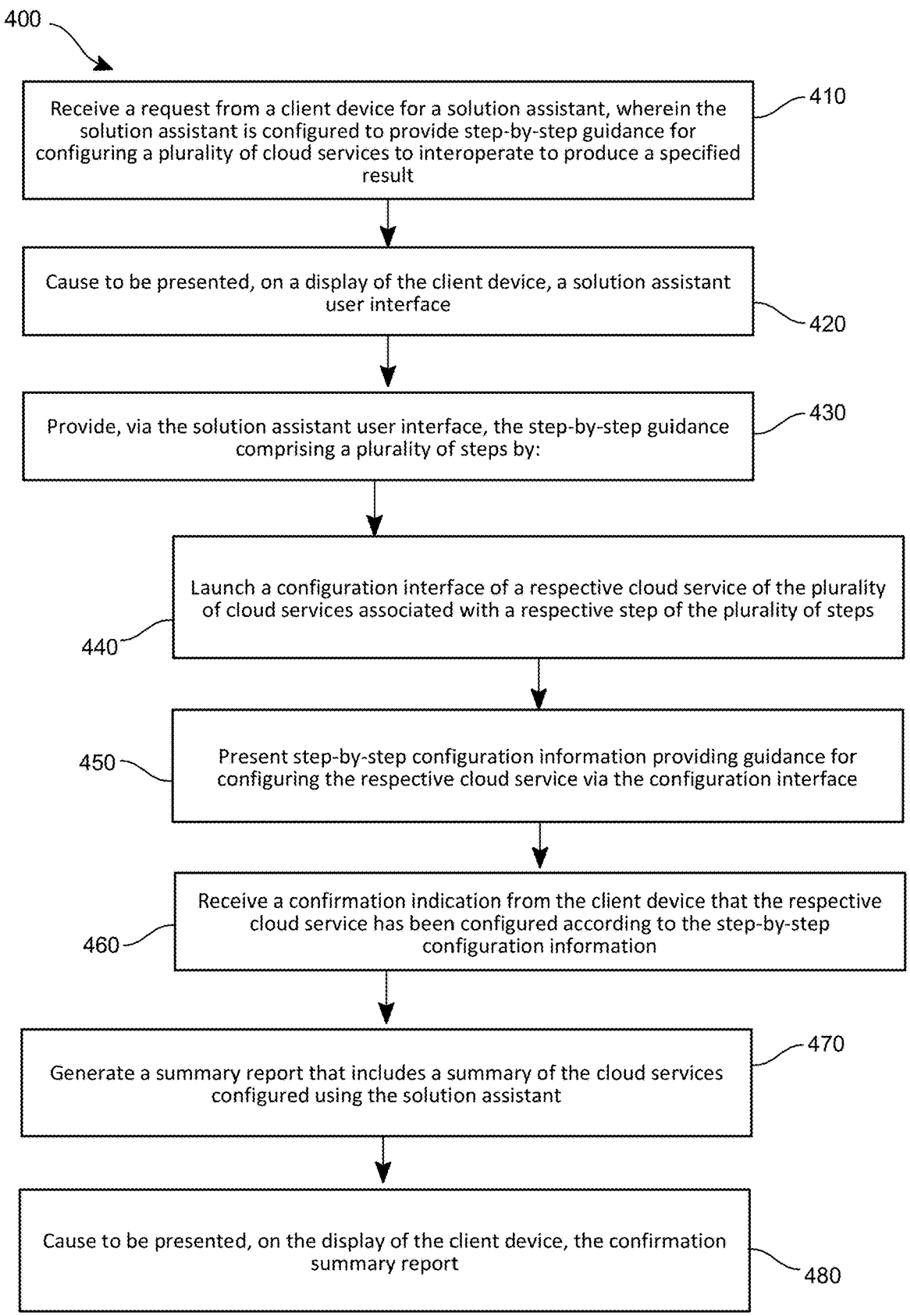
FIG. 4 is a flow diagram of a process for end-to-end configuration assistance for cloud services.

FIG. 4 is a flow chart of an example process 400 for end-to-end configuration assistance for cloud services. The process 400 may be implemented by the admin center service 110. The process shown in FIG. 4 may be implemented using the solution assistant user interface 325 shown in FIGS. 3A-3G.

The process 400 may include an operation 410 of receiving a request from a client device for a solution assistant. The solution assistant may be configured to provide step-by-step guidance for configuring a plurality of cloud services to interoperate to produce a specified result as discussed in the preceding examples. The user may select a solution assistant from the solution assistant pane 320 of the user interface 305 shown in FIG. 3B.

The process 400 may include an operation 420 of causing to be presented, on a display of the client device, a solution assistant user interface. The solution assistant user interface 325 may be displayed in response to the user selecting the solution assistant from the solution assistant pane 320.

The process 400 may include an operation 430 of providing, via the solution assistant user interface, the step-by-step guidance comprising a plurality of steps. The operation 430 may include the sub-operations 440, 450, and 460. As discussed in the preceding examples, the solution assistant may include multiple steps, and each step may be associated with configuring a particular cloud service as shown in FIGS. 3C-3F.

The suboperation 440 includes launching a configuration interface of a respective cloud service of the plurality of cloud services associated with a respective step of the plurality of steps. The examples of FIGS. 3C-3F show examples of the configuration interface of the cloud service being configured in that step of the solution assistant.

The suboperation 450 includes presenting step-by-step configuration information providing guidance for configuring the respective cloud service via the configuration interface. As shown in the preceding examples, the solution assistant user interface 325 may present a video clip that demonstrates to the user how to configure cloud services being configured in the current step of the solution assistant. The solution assistant user interface 325 may also present textual content that explains to the user how to configure the cloud service being configured in the current step of the solution assistant.

The suboperation 460 includes receiving a confirmation indication from the client device that the respective cloud service has been configured according to the step-by-step configuration information. The user may confirm that the respective cloud service associated with the step has been configured by clicking the "next" button on the solution assistant user interface 325 to move on the next step of the solution assistant. The user may also click on the "configuration check" button to cause the solution assistant to perform a configuration check to determine whether the user has configured the parameters in the application 330 that were specified in the textual and/or video content presented by the solution assistant user interface 325.

The process 400 may include an operation 470 of generating a summary report that includes a summary of the cloud services configured using the solution assistant, and an operation 480 of causing to be presented, on the display of the client device, the confirmation summary report. As discussed with respect to the example implementation shown in FIG. 3G, the admin center service 110 may generate the configuration summary that provides a brief description of the steps that were performed to configure the cloud services and the solution assistant user interface 325 may show the configuration summary.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
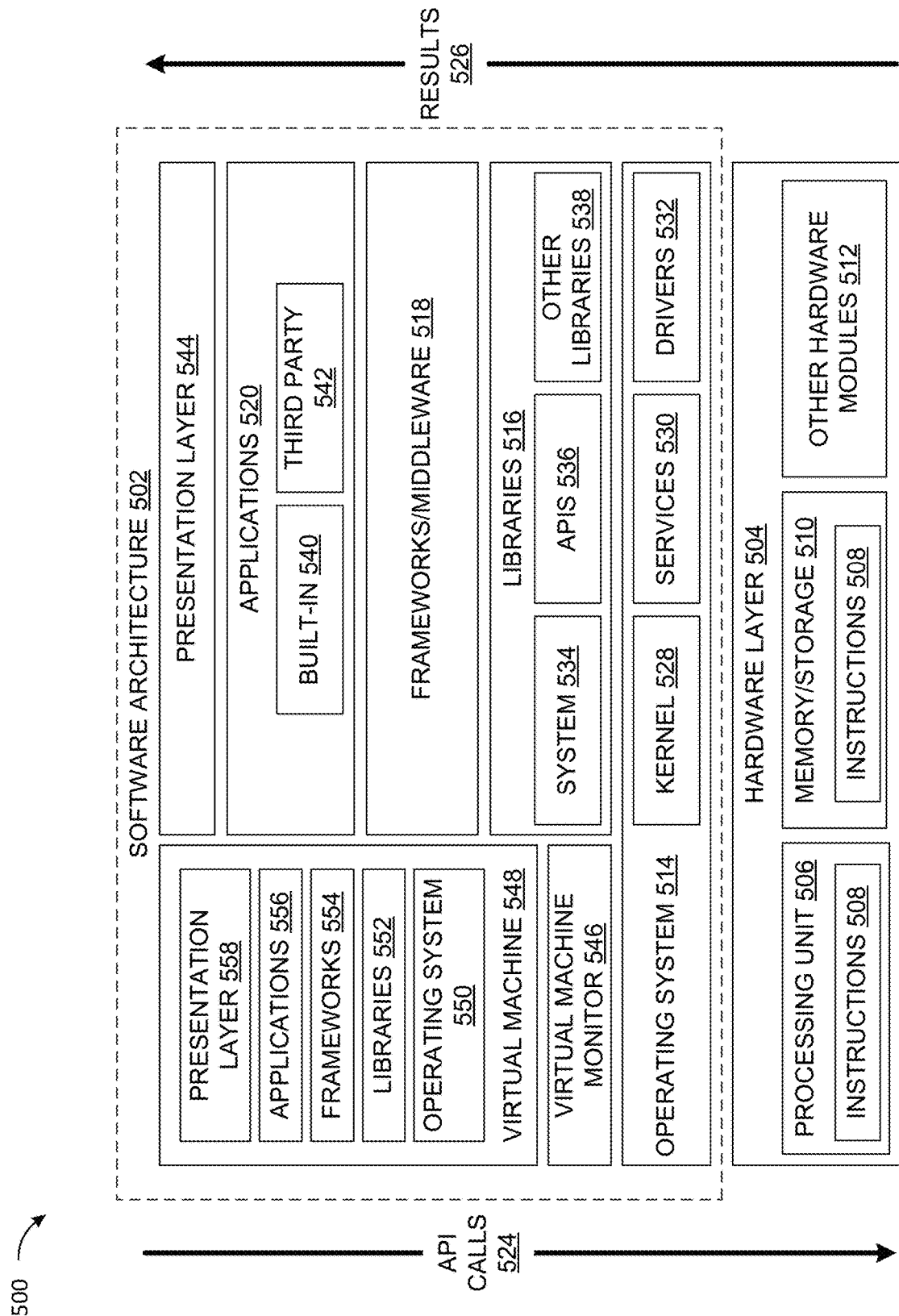
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
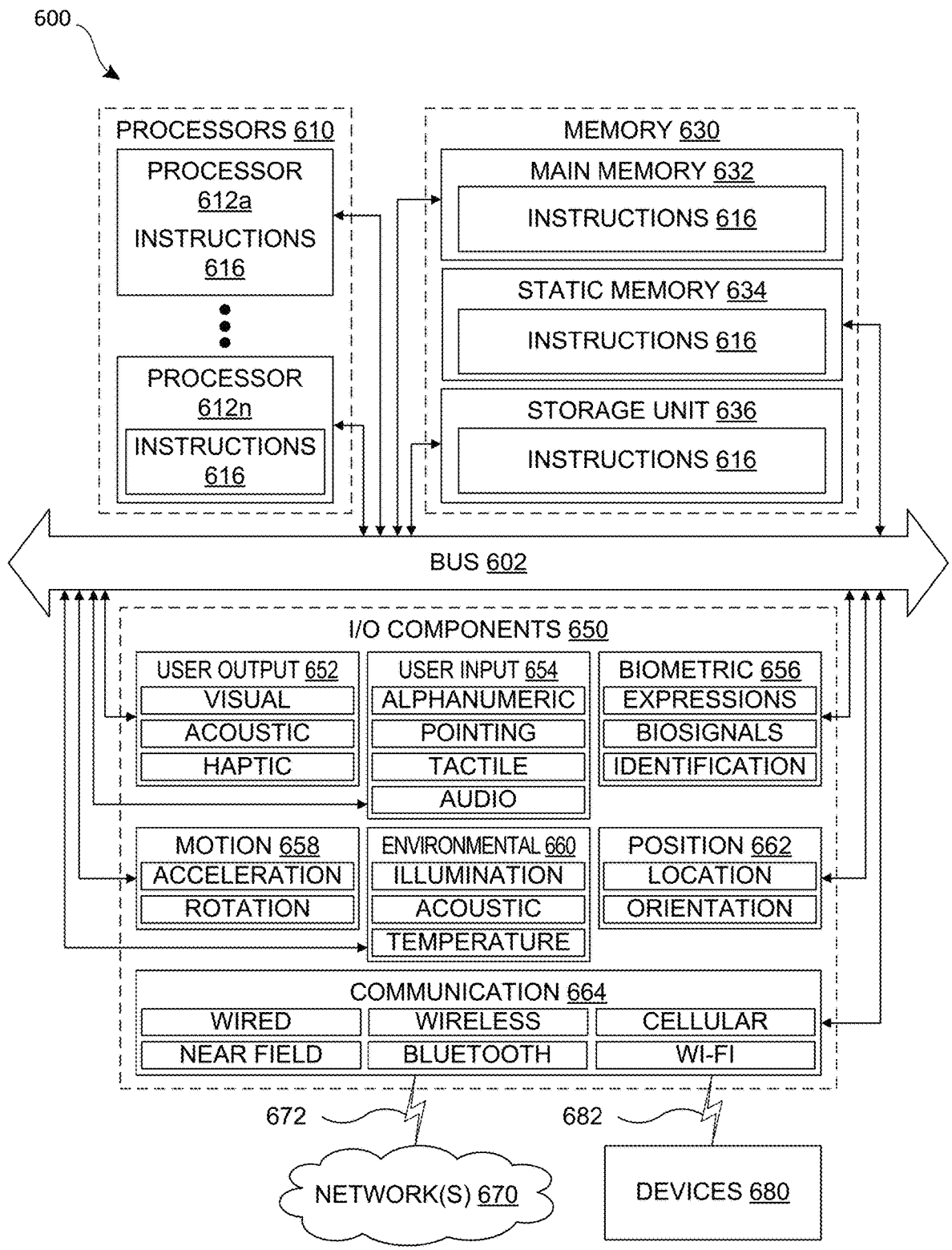
FIG. 6 is a block diagram showing components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions that, when executed, cause the processor to perform operations comprising:
receiving a request from a client device for a solution assistant, wherein the solution assistant is configured to provide step-by-step guidance for configuring a plurality of cloud services to interoperate to produce a specified result;
causing to be presented, on a display of the client device, a solution assistant user interface;
providing, via the solution assistant user interface, the step-by-step guidance comprising a plurality of steps by:
launching a configuration interface of a respective cloud service of the plurality of cloud services associated with a respective step of the plurality of steps;
presenting step-by-step configuration information providing guidance for configuring the respective cloud service via the configuration interface; and
receiving a confirmation indication from the client device that the respective cloud service has been configured according to the step-by-step configuration information;
generating a summary report that includes a summary of the cloud services configured using the solution assistant; and
causing to be presented, on the display of the client device, the confirmation summary report.

2. The data processing system of claim 1, wherein the step-by-step configuration information includes video content demonstrating how to configure the respective cloud service via the configuration interface.

3. The data processing system of claim 1, wherein the step-by-step configuration information includes textual content describing how to configure the respective cloud service via the configuration interface.

4. The data processing system of claim 1, wherein the computer-readable medium includes instructions configured to cause the processor to perform operations of:
performing a configuration check to determine whether each parameter described in the step-by-step configuration information has been configured for a respective cloud service.

5. The data processing system of claim 4, wherein the computer-readable medium includes instructions configured to cause the processor to perform operations of:
automatically launching the configuration interface for the respective cloud service responsive to the configuration check determining that one or more parameters have not been configured.

6. The data processing system of claim 1, wherein the computer-readable medium includes instructions configured to cause the processor to perform operations of:
for each of the plurality of cloud services, capturing user inputs into the configuration interface of the cloud service; and
storing the user inputs as saved configuration information in a datastore.

7. The data processing system of claim 6, wherein the computer-readable medium includes instructions configured to cause the processor to perform operations of:
receiving a request from the client device to restore a previous state of the solution assistant;
accessing the saved configuration information of the solution assistant;
causing the solution assistant user interface to be presented on the display of the user interface; and
populating the solution assistant user interface with the saved configuration information.

8. A method implemented in a data processing system for end-to-end configuration assistance for cloud services, the method comprising:
receiving a request from a client device for a solution assistant, wherein the solution assistant is configured to provide step-by-step guidance for configuring a plurality of cloud services to interoperate to produce a specified result;
causing to be presented, on a display of the client device, a solution assistant user interface;
providing, via the solution assistant user interface, the step-by-step guidance comprising a plurality of steps by:
launching a configuration interface of a respective cloud service of the plurality of cloud services associated with a respective step of the plurality of steps;
presenting step-by-step configuration information providing guidance for configuring the respective cloud service via the configuration interface; and
receiving a confirmation indication from the client device that the respective cloud service has been configured according to the step-by-step configuration information;
generating a summary report that includes a summary of the cloud services configured using the solution assistant; and
causing to be presented, on the display of the client device, the confirmation summary report.

9. The method of claim 8, wherein the step-by-step configuration information includes video content demonstrating how to configure the respective cloud service via the configuration interface.

10. The method of claim 8, wherein the step-by-step configuration information includes textual context describing how to configure the respective cloud service via the configuration interface.

11. The method of claim 8, further comprising:
performing a configuration check to determine whether each parameter described in the step-by-step configuration information has been configured for a respective cloud service.

12. The method of claim 11, further comprising:
automatically launching the configuration interface for the respective cloud service responsive to the configuration check determining that one or more parameter has not been configured.

13. The method of claim 8, further comprising:
for each of the plurality of cloud services, capturing user inputs into the configuration interface of the cloud service; and
storing the user inputs as saved configuration information in a datastore.

14. The method of claim 13, further comprising:
receiving a request from the client device to restore a previous state of the solution assistant;
accessing the saved configuration information of the solution assistant;
causing the solution assistant user interface to be presented on the display of the user interface; and
populating the solution assistant user interface with the saved configuration information.

15. A machine-readable medium on which are stored instructions that, when executed, cause a processor of a programmable device to perform functions of:
receiving a request from a client device for a solution assistant, wherein the solution assistant is configured to provide step-by-step guidance for configuring a plurality of cloud services to interoperate to produce a specified result;
causing to be presented, on a display of the client device, a solution assistant user interface;
providing, via the solution assistant user interface, the step-by-step guidance comprising a plurality of steps by:
launching a configuration interface of a respective cloud service of the plurality of cloud services associated with a respective step of the plurality of steps;
presenting step-by-step configuration information providing guidance for configuring the respective cloud service via the configuration interface; and
receiving a confirmation indication from the client device that the respective cloud service has been configured according to the step-by-step configuration information;
generating a summary report that includes a summary of the cloud services configured using the solution assistant; and
causing to be presented, on the display of the client device, the confirmation summary report.

16. The machine-readable medium of claim 15, wherein the step-by-step configuration information includes video content demonstrating how to configure the respective cloud service via the configuration interface.

17. The machine-readable medium of claim 15, wherein the step-by-step configuration information includes textual context describing how to configure the respective cloud service via the configuration interface.

18. The machine-readable medium of claim 17, further comprising instructions configured to cause the processor to perform operations of:
performing a configuration check to determine whether each parameter described in the step-by-step configuration information has been configured for a respective cloud service.

19. The machine-readable medium of claim 15, further comprising instructions configured to cause the processor to perform operations of:
automatically launching the configuration interface for the respective cloud service responsive to the configuration check determining that one or more parameter has not been configured.

20. The machine-readable medium of claim 15, further comprising instructions configured to cause the processor to perform operations of:
for each of the plurality of cloud services, capturing user inputs into the configuration interface of the cloud service;
storing the user inputs as saved configuration information in a datastore;
receiving a request from the client device to restore a previous state of the solution assistant;
accessing the saved configuration information of the solution assistant;
causing the solution assistant user interface to be presented on the display of the user interface; and
populating the solution assistant user interface with the saved configuration information.

* * * * *